April 21, 1925.    1,534,602
R. MAUVAIS
HAY CONVEYER
Filed Jan. 17, 1923
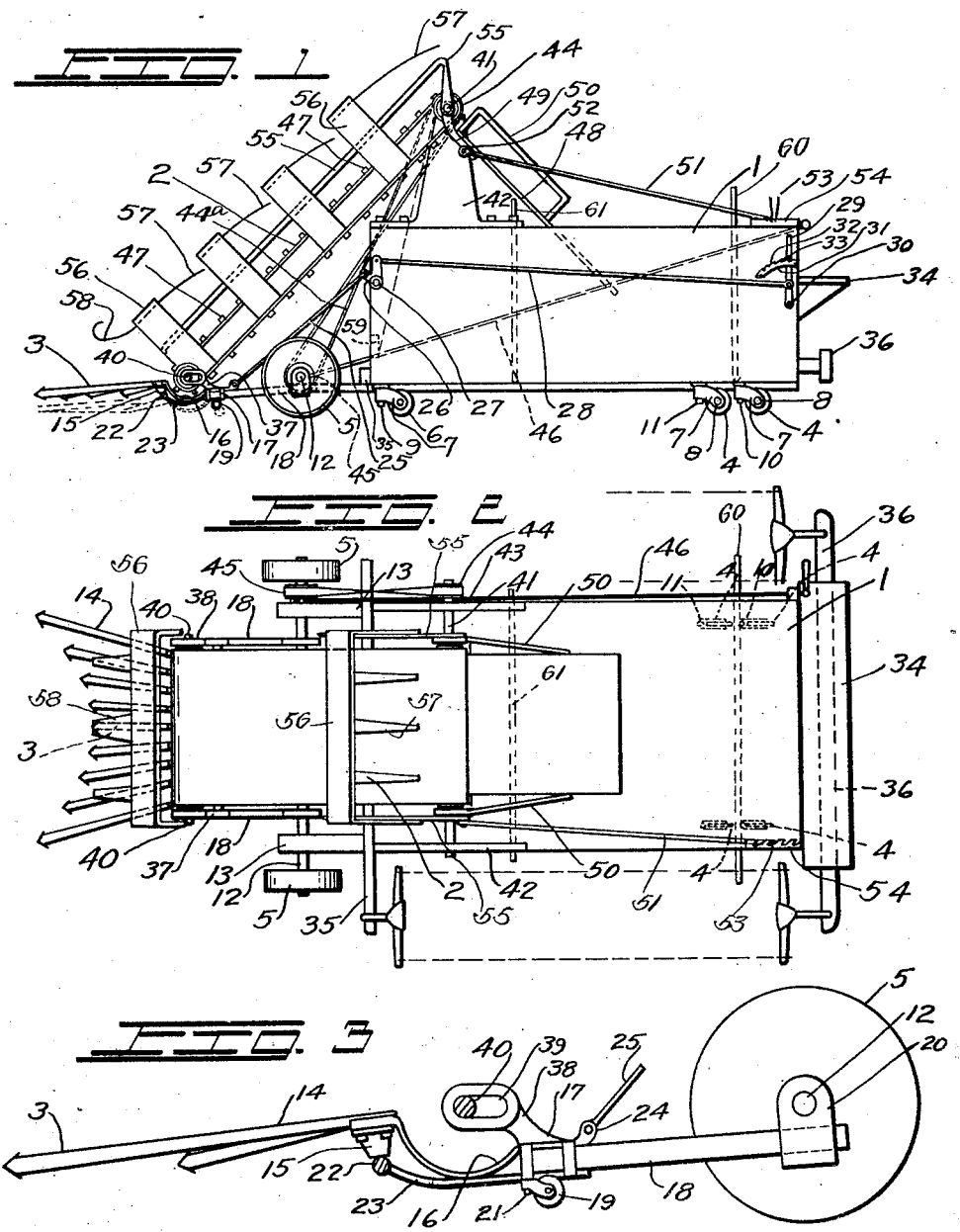
INVENTOR
Romeo Mauvais
Harry Bowen
ATTORNEY Patented Apr. 21, 1925.

1,534,602

UNITED STATES PATENT OFFICE.

ROMEO MAUVAIS, OF TWO RIVERS, WASHINGTON.

HAY CONVEYER.

Application filed January 17, 1923. Serial No. 613,176.

*To all whom it may concern:*

Be it known that I, ROMEO MAUVAIS, a citizen of the United States, residing at Two Rivers, county of Walla Walla, and State of Washington, have invented a new and useful Hay Conveyer; and I do hereby declare that the following is a full, clear, and exact specification, such as will enable others skilled in the art to which it appertains to make and use the same.

The invention is a device for picking up, elevating, and conveying hay from windrows or shocks to a stack or barn.

One object of the invention is to provide a device that will pick all of the hay from a windrow or shock without leaving any waste.

Another object of the invention is to provide a device that will gather up all of the hay in the windrow or shock and deposit it in a container within itself.

And a further object of the invention is to provide a device which will gather up and carry a large amount of hay from a windrow or shock to a stack or barn.

With these ends in view the invention embodies a large box supported on suitable wheels, a conveyer on the front end of the box for elevating hay and dumping it into the box and a rake on the front end of the conveyer for gathering up the hay and feeding it to the conveyer.

Other features and advantages of the invention will appear from the following description taken in connection with the drawings, wherein:—

Figure 1 is a side elevation.

Figure 2 is a top plan view with parts removed.

Figure 3 is a detail showing the connections between the rake teeth and the front wheels.

In the drawings I have shown my device as it would be constructed wherein numeral 1 indicates the box forming the body of the device, numeral 2 the conveyer and numeral 3 the rake.

The box is supported on casters 4 at the rear and on wheels 5 and casters 6 at the front. The caster wheels are supported in frames 7 through the pins 8 and these frames are pivotally attached to the bottom of the box 1 by the bolts 9 and 10 and 11. The front wheels 5 are constructed with differentials in their hubs and mounted upon an axle 12 which is attached to the box 1 through the beams 13.

The rake teeth 14 which have supporting lugs 15 under their rear ends, are supported on individual springs 16 and these are connected to a frame 17 that is mounted on the end of bars 18, one end of which are supported on casters 19 and the other in hangers 20 from the axle 12. The casters 19 are pivotally attached to the lower side of the frame 17 by the bolts 21 and when working the frame and rake will be lowered to the position shown in dotted lines in Figure 1 and the casters 19 will rest on the ground in order to prevent the teeth from sticking into the ground. A rod 22 is supported on arms 23 from the bottom of the frame 17 and bears against the under sides of the lugs 15 to prevent them from bending downward as they strike an obstruction. It is seen that as each tooth is supported on an individual spring and as the bar 22 prevents them from moving downward they will move upward individually as they strike an obstruction thereby permitting the remaining teeth of the rake to continue in the downward position while the individual tooth moves upward while passing the obstruction.

At the rear of the frame 17 is an eye 24 to which a rod 25 is attached which supports the frame and rake and through which the rake is raised and lowered. The opposite end of the rod 25 is attached to a lever 26 which is pivoted on a bolt 27 on the side of the box 1 and to this lever is also attached a rod 28 which connects it to the hand lever 29. The hand lever is supported on a bolt 30 on the side of the box and held in a rack 31 which has notches 32 in it for engaging a pawl 33. It will be seen that by moving the hand lever 29 forward the rake will be lowered to the position shown in dotted lines in Figure 1 and by moving it backward to the position shown in full lines in Figure 1 the rake will be raised.

At the rear of the box 1 is a platform 34 and at the front is a bar 35 which projects beyond the sides so that single-trees may be connected to each end that would be in line with other single-trees connected to the ends of an evener 36 which may be attached to the rear of the box when the device is operated by horses, one being placed on each side of the box.

At each end of the frame 17 and extending upward from is upper side are two arms 37 and 38 which have elongated holes 39 in them through which the tail shaft 40 of the conveyer 2 is placed. The lower sprockets or pulleys of the conveyer are mounted upon this shaft and the upper sprockets or pulleys are mounted upon the head shaft 41 which is supported in brackets 42 and 43 from the box 1. A pulley 44 is also mounted upon this shaft 41 and is driven by a belt 44ª from a clutch pulley 45 on the shaft 12, which clutch is operated by the rod 46 from the platform 34. It will be seen that by crossing the belt as shown the conveyer will travel upward and the cleats 47 on it will engage hay upon the rake 3 and carry it upward to the top of the conveyer from where it will fall upon a chute 48. This chute will be pivotally supported from the head shaft 41 through the brackets 49 and will have guard rails 50 on its sides to keep the hay from falling off. A rod 51 may be attached to the side of the chute by a bolt 52 at one end and bent upward to form a handle 53 at the other and this handle may be held in a rack 54 on the side of the box 1 and at a point adjacent the operator's seat so that by it the operator may move the chute upward or downward.

A guard rail 55 may be placed at the sides of the conveyer 2 and this may be held by brackets 56 which also hold spring plates 57 above the conveyer for holding the hay against it. Another spring 58 may be placed on the bracket 56 at the lower end of the conveyer which will force the hay against the cleats 47 so that it may readily be picked up. The springs 57 will then hold the hay against the conveyer and as their upper ends spring inward they will act as check valves and make it impossible for the hay to slide downward.

It will be understood that changes may be made in the construction without departing from the spirit of the invention. One of which changes may be in the design of the box or wagon, another may be in the type of conveyer, and still another may be in the means of raising and lowering the rake and conveyer or in the means for driving the conveyer.

The construction will be readily understood from the foregoing description. To use the device it may be constructed as shown and any suitable motive power may be attached to the box or bar 36. The rake 3 may then be lowered by the lever 29 and as both the rake and the lower end of the conveyer are mounted upon the frame 17 which is pivotally supported from the shaft 12, the lower end of the conveyer will move downward with the rake and the tail shaft 40 will move to the opposite end of the slot 39. The chute 48 may be raised to any desired position as hereinbefore described. As the device is moved forward the wheels 5 will rotate and cause the head shaft 41 of the conveyer to rotate also through the belt 44ª. As the head shaft rotates the upper side of the conveyer will move upward and it will pick up hay which has been gathered up from the windrows or shocks by the rake 3, and carry it upward and discharge it upon the chute 48. As the box or wagon fills the chute may be moved downward until it strikes a cross member 59 shown in dotted lines in Figure 1 in the end of the box.

It will also be seen that as the device moves forward the rake teeth will move across the ground and as they are supported independently and have beveled tips they may be placed very close to the ground and as any one of them strikes an obstruction or an uneven portion of the ground it will glide up over it and the remaining teeth will pick up the hay on each side.

The double casters at the rear and the caster behind the front wheels of the wagon will also take care of any unevenness of the ground or ditches through it as when one caster or wheel moves over a ditch the other will hold the device in the normal position until the first one has passed over and then the first one will support the device while the second one is passing over.

As the box or wagon fills with hay the rake and conveyer may be raised to the position shown in Figure 1, the conveyer stopped through the clutch in the pulley 45, and the entire device propelled to the stack or barn where the hay may be removed from it by any desirable means. Straps, chains, or a sling as indicated by dotted lines in Figures 1 and 2 and designated by numerals 60 and 61 may be placed in the box before it is loaded with hay and the ends of these may be caught by a hook from a derrick or block so that the entire amount of hay may be conveniently lifted from the device.

Having thus fully described the invention what I claim as new and desire to secure by Letters Patent, is:—

1. A hay conveyer of the class described having a body in the form of a large box, an axle in front of the body having wheels on its outer ends for supporting the forward end of the body, double casters under the rear of the body for supporting the rear, a rake having horizontal teeth pivotally supported in front of the axle, said rake having a frame in which the teeth are held by springs, a bar extending from the frame to a point under the teeth to prevent them moving downward, a conveyer extending from the rake to a point above the box, said conveyer having a lower shaft at the rake and an upper shaft above the body, arms having elongated holes extending upward from the rake for supporting the lower shaft of the conveyer, frames on the body for supporting the upper shaft of the conveyer, levers and rods pivotally mounted on the side of the body through which the rake and lower end of the conveyer may be raised or lowered from the rear of the body, pulleys on the axle in front of the body and on the upper shaft of the conveyer with a belt passing over them for driving the conveyer through the wheels on the axle, a chute pivotally supported under the upper end of the conveyer, means for raising and lowering the chute from the rear of the body, guards on the sides of the conveyer, and springs above the conveyer for pressing the material against it.

2. A hay conveyer of the class described comprising a large box in the form of a wagon body; an axle with wheels on it for supporting the forward end of the box; double castors under the rear of the body for supporting the rear; other castors under the forward end of the body, a platform at the rear of the body; a device at the rear of the body by which it may be pushed by a tractor, or to which an evener may be attached when it is operated by horses or the like; a horizontal rake with individually supported spring teeth in front of the axle; a frame for supporting the rake; means for pivotally supporting the frame from the axle; levers and a ratchet for raising and lowering the rake; an inclined conveyer extending from the rake to a point above the body, said conveyer having the lower shaft at the rake and the upper shaft above the body; arms with elongated holes extending upward from the rake frame for supporting the lower shaft of the conveyer; brackets on top of the body for supporting the upper shaft of the conveyer; a belt passing over a pulley on the axle and another on the upper shaft of the conveyer for driving the conveyer; one of said pulleys having a clutch in it; guards on the sides of the conveyer; spring plates above the conveyer; a downwardly extended chute pivotally attached to the upper end of the conveyer; guides on the sides of the chute; a rod which is attached to one end of the chute and which extends to the rear of the body; and means for adjustably holding the rod so that the chute may be held in different positions.

3. A conveyer for hay or the like comprising a large box in the form of a wagon body; an axle at the forward end of the body; wheels at the ends of the axle; castors under the ends of the body for supporting it; an attachment at the rear of the body through which suitable motive power may be applied to it; a frame with castors under it pivotally supported from the axle and extending ahead of it; prongs connected to the frame by individual springs and extending forward in a slightly inclined position; means under the prongs for limiting their downward movement; means for raising and lowering the frame and prongs; a conveyer with one end attached to the frame behind the prongs and the other end supported above the body; and means for operating the conveyer from the axle of the front wheels.

4. A device for conveying hay or the like comprising a large box similar to a wagon body; castors under the forward end of said box; double castors under the rear of said box; an attachment on said box through which motive power may be applied to it; an axle in front of said box with wheels on the ends; a rake in front of said axle, said rake having a frame supported from the axle, teeth individually supported on spring members and a means through which it may be raised and lowered; an inclined conveyer extending from a point somewhat behind the teeth of said rake to a point above the box; and means for operating the conveyer from the axle.

5. In a device for conveying hay or the like, a large box, castors for supporting the box, an attachment by which motive power may be applied to the box, an axle in front of the box, wheels on the ends of the axle, a rake in front of the axle, means for raising and lowering the rake, an inclined conveyer extending from a point somewhat behind the rake teeth to a point above the box, means for operating the conveyer from the axle, guards on the sides of the conveyer, spring guards above the conveyer, a chute extending downward from the upper end of the conveyer, and a means for raising and lowering the chute.

ROMEO MAUVAIS.